(12) United States Patent
Lausch (10) Patent No.: US 12,523,563 B2
(45) Date of Patent: Jan. 13, 2026

(54) PLUGS FOR ANCHORING WITHIN EQUIPMENT AND METHODS OF USE FOR PRESSURE TESTING

(71) Applicant: John C. Lausch, Santa Fe, TX (US)

(72) Inventor: John C. Lausch, Santa Fe, TX (US)

( * ) Notice: Subject to any disclaimer, the term of this patent is extended or adjusted under 35 U.S.C. 154(b) by 491 days.

(21) Appl. No.: 18/072,350

(22) Filed: Nov. 30, 2022

(65) Prior Publication Data
US 2023/0167934 A1 Jun. 1, 2023

Related U.S. Application Data

(60) Provisional application No. 63/407,347, filed on Sep. 16, 2022, provisional application No. 63/326,022, (Continued)

(51) Int. Cl.
G01M 3/02 (2006.01)
F16L 55/11 (2006.01)
F16L 55/132 (2006.01)

(52) U.S. Cl.
CPC .............. *G01M 3/022* (2013.01); *F16L 55/11* (2013.01); *F16L 55/1108* (2013.01); *F16L 55/132* (2013.01)

(58) Field of Classification Search
CPC ........ B23K 9/326; F16L 13/128; F16L 55/11; F16L 55/1108; F16L 55/1141; F16L 55/1152; F16L 55/12; F16L 55/128; F16L 55/13; F16L 55/132; F16L 55/136; F16L 55/1645; F16L 55/16455; F28F 11/02;
(Continued)

(56) References Cited

U.S. PATENT DOCUMENTS

| 922,544 | A | * | 5/1909 | Turner | F16L 55/132 138/90 |
| 1,068,793 | A | * | 7/1913 | Mason | F16L 55/132 220/236 |

(Continued)

FOREIGN PATENT DOCUMENTS

| CH | 260026 A | * | 2/1949 | |
| GB | 1258369 A | * | 12/1971 | ............ F16L 55/136 |
| GB | 1337161 A | * | 11/1973 | |

*Primary Examiner* — Kenneth Rinehart
*Assistant Examiner* — Richard K. Durden
(74) *Attorney, Agent, or Firm* — McCutcheon Joseph, PLLC (57) ABSTRACT

A plug for isolating and pressure testing a hollow piece of equipment (e.g., a container or tubular) comprises a compression nut, a semi-conical mandrel shaft (which may be one or two pieces), and a compression member. The compression nut and the semi-conical mandrel shaft are threaded together, directly or indirectly via a spacer and plug body, such that the rotation of the compression nut forces the mandrel shaft through the compression member, and the semi-conical surface expands the compression member against an interior surface of the hollow piece of equipment to anchor in place and seal off a testing space. Internal channels running through the compression nut (and if present, the plug body) permit externally pressurized fluid and sensors to communicate with the testing space. The compression member can be configured to test either one end of the piece of hollow equipment or a particular region between the two seals.

11 Claims, 9 Drawing Sheets

Related U.S. Application Data filed on Mar. 31, 2022, provisional application No. 63/264,676, filed on Nov. 30, 2021.

(58) Field of Classification Search
CPC ........ F28F 11/04; G01M 3/022; G01M 3/223; G01M 3/2853; G01M 3/2884
USPC ............. 73/46, 49.1, 49.5, 49.8; 138/90, 91; 220/237
See application file for complete search history.

(56) References Cited

U.S. PATENT DOCUMENTS

| | | | | |
|---|---|---|---|---|
| 1,335,117 A * | 3/1920 | Kofoed | ................... | F28F 11/04 29/523 |
| 1,644,118 A * | 10/1927 | Florence | ............... | F16L 55/124 220/237 |
| 2,241,526 A * | 5/1941 | Rosenkranz | .......... | G01M 3/022 138/90 |
| 3,568,721 A * | 3/1971 | Ross | ........................ | F28F 11/00 81/448 |
| 3,691,609 A * | 9/1972 | Ice, Jr. | ................... | B21D 53/06 165/76 |
| 4,114,654 A * | 9/1978 | Richardson | ............. | F16L 13/11 165/76 |
| 4,393,564 A * | 7/1983 | Martin | ..................... | F28F 11/02 29/523 |
| 4,574,618 A * | 3/1986 | Anthony | ............... | G01M 3/223 73/40.5 R |
| 4,659,126 A * | 4/1987 | Breck | ................... | F16L 55/132 294/93 |
| 4,967,468 A * | 11/1990 | Vossbrinck | ........... | B23P 19/025 29/890.038 |
| 5,396,956 A * | 3/1995 | Cherewyk | ........... | E21B 17/1007 166/88.1 |
| 5,844,127 A * | 12/1998 | Berube | ................. | F16L 55/132 73/49.8 |
| 6,131,441 A * | 10/2000 | Berube | ................. | G01M 3/022 73/49.8 |
| 7,314,065 B1 * | 1/2008 | Adelman | ................ | F16L 55/11 138/90 |
| 10,724,808 B2 * | 7/2020 | Alhassan | ................. | F28F 11/02 |
| 2018/0111233 A1 * | 4/2018 | Arnett | ................. | B23K 37/053 |

* cited by examiner

PLUGS FOR ANCHORING WITHIN EQUIPMENT AND METHODS OF USE FOR PRESSURE TESTING

REFERENCE TO RELATED APPLICATIONS

The present application is a US non-provisional patent application claiming priority to and benefit from U.S. provisional application No. 63/264,676, filed on Nov. 30, 2021 and entitled "Self-Hydrostatic Testing Tubing Plug," U.S. provisional application No. 63/326,022, filed Mar. 31, 2022 and entitled "Test Plugs & Methods For Testing," and U.S. provisional application No. 63/407,347, filed Sep. 16, 2022 and entitled "Plugs, Pressure Testing Methods & Anchoring." The entire contents of the above-listed applications are fully incorporated by reference for all purposes herein.

FIELD

This invention relates to plugs for anchoring within a hollow structure (e.g., within a container, or within a tubular) and specifically to test plugs for pressure testing the hollow structure (e.g., to test the pressure rating of a container after a repair is made, or to test the attachment of a tubular with a second, adjacent tubular.)

BACKGROUND

There are a wide variety of known plugs used for testing sealing effectiveness of a previously-installed plug; and for establishing a sealed test space within a hollow space or item to be tested, including, but not limited to, a tubular such as those found in heat exchangers or oilfield strings.

Various problems and limitations encountered with some known plugs include the need to pressurize the entirety of a volume or at least a relatively large portion thereof with a test fluid (e.g., hydrotesting with water) which may result in accidental fluid ingress to undesired portions of the equipment, degrading or damaging it over time or possibly causing critical failure if water is improperly retained. Additionally, the inability to effect a test from outside the volume and the need for significant resources (personnel, time, specialized tools) to conduct tests can lead to both economic and safety risks inherent to operating and pressurizing large volumes of fluid under pressure.

Accordingly, a need exists for a plug tester and method of use which may be configured to pressurized externally of the hollow equipment, and which may be positionable along the piece of equipment to only test a portion of the equipment, thereby requiring less fluid in order to reach tested pressures and reduce the safety hazards.

Various embodiments of test plugs and methods of use disclosed herein meet these needs, solve the problems listed above, and other problems noted below.

SUMMARY

Embodiments of the present invention provide tools and methods of pressure testing hollow equipment (e.g., containers and tubulars) using a test plug comprising a mandrel shaft, a compression nut, and a cylindrical compression member comprising one or more seals disposed about the mandrel shaft. The compression nut may comprise engagement threads and at least one internal channel extending therethrough, and the mandrel shaft may comprise a semi-conical outer surface with a narrow end and a broad end, the narrow end comprising engagement threads for direct or indirect engagement (e.g., by means of a spacer) with the engagement threads of the compression nut. Once attached, rotation of the compression nut pulls the mandrel shaft through the cylindrical compression member, forcing the one or more seals outward to seal against an interior surface of the hollow equipment. In some embodiments, the mandrel shaft may comprise a bore at the narrow end, and the compression nut may comprise an internal shaft facing inward and directly mating with the bore at the narrow end of the mandrel shaft. In other embodiments, the compression nut may further comprise an external shaft facing outward and capable of threading or otherwise attaching to testing equipment to place it in fluid communication with the sealed portion of the interior space. In some embodiments, the invention may further comprise a washer between the between the compression nut and the hollow piece of equipment, the washer being compressed when the compression nut is threaded.

Other tool and method embodiments of the present invention may include a mandrel shaft comprising separate mandrel and shaft pieces, the shaft retaining the semi-conical outer surface, and the mandrel disposed around the shaft with its own semi-conical outer surface, oriented opposite to the shaft's. The mandrel may thereby compress against the hollow piece of equipment in lieu of the washer, and the semi-conical outer surfaces of both the mandrel and the shaft can act to push the compression member outward at both ends, creating an internal space between the mandrel and the shaft to enable pressurized testing of specific segments of the hollow piece of equipment (e.g., a tubular which has been repaired by welding). In some embodiments, the shaft may comprise an internal channel and extend through the compression nut internal channel, such that the testing equipment is threaded into the shaft and testing fluid is pressurized through the shaft internal channel, which terminates at a lateral outlet between the semi-conical outer surfaces of the shaft and mandrel.

Still other tool and method embodiments of the present invention may include a plug body with a threaded end and a flanged end, wherein the flanged end is disposed about the narrow end of the semi-conical surface of the mandrel shaft, and the threaded end is engaged with the compression nut. The plug body can then be engaged with the narrow end of the mandrel shaft by means of a double-ended spacer with threaded exterior shafts on each end. Rotating the compression nut along the threaded end of the plug body thus pulls the mandrel shaft inward through the compression member and forces the seals out against an interior surface of the hollow piece of equipment to form a testing space. A compression sleeve may be disposed around the plug body to abut the flanged end when compressed. The plug body may also comprise an external shaft with an internal channel and secondary threading testing equipment. In some embodiments, the plug body's internal channel may be concentric to a corresponding internal channel on the double-ended spacer which exits via lateral ports on the spacer into the testing space.

Various embodiments of the disclosure are discussed in detail below. When specific implementations are discussed, it should be understood that this is done for illustration purposes only. A person skilled in the art will recognize that the other components and configurations may be used without departing from the scope of the disclosure.

DRAWINGS

Throughout the description of the embodiments, reference is made to the following drawings, which illustrate some advantages and principles of the described embodiments.

In showing and describing these embodiments, like or identical reference numerals are used to identify common or similar elements. The figures are not necessarily to scale and certain features and certain views of the figures may be shown exaggerated in scale or in schematic in the interest of clarity, conciseness, and disclosure.

DETAILED DESCRIPTION

Before describing selected embodiments of the present disclosure in detail, it is to be understood that the present invention is not limited to the embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

Moreover, it will be understood that various directions such as "upper," "lower," "bottom," "top," "left," "right," and so forth are made only with respect to explanation in conjunction with the drawings, and that the components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Turning first to FIGS. 1-4, the drawings show an embodiment of a plug 10 comprising a compression nut 14, a seal washer 15, a compression member 20, and a compression cone 30. The compression cone 30 has a body bore 32 having internal threading 33 and an outer ramped surface 31.

The compression nut 14 has a face 19 and a shaft 11 with a threaded end 35 for threadedly engaging the internal threading 33 of the bore 32 upon rotation of the nut 14. The nut 14 has a test shaft 13 (see FIG. 3) with an internal channel 13a therethrough from end to end through which test fluid, (e.g., but not limited to air, helium, nitrogen or water) flows under pressure to a defined space within a piece of equipment to be pressure tested, e.g., an enclosed container or a tubular with an interior space. The seal washer 15 has a body 15a and a central bore 15b through which can project the shaft 11 of the nut 14. The seal washer 15 can be made of any suitable sealing material, e.g., rubber, plastic, elastomeric, polytetrafluoroethylene (PTFE), or graphite.

Figure 1:
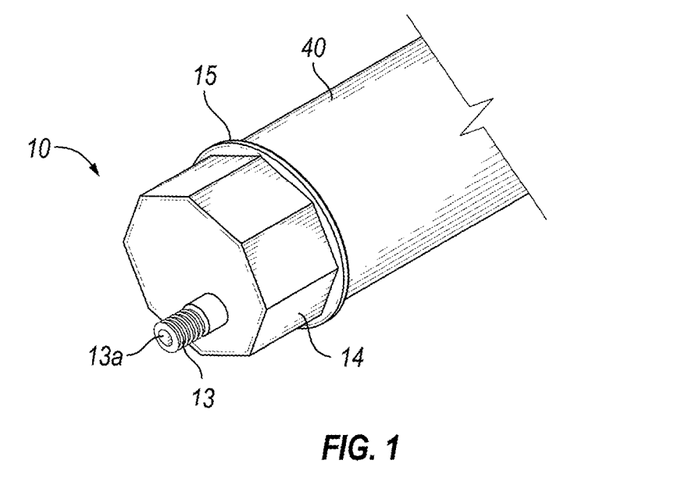
FIG. 1 is a perspective view of an embodiment of a plug according to the present invention installed in a tubular.
Figure 2:
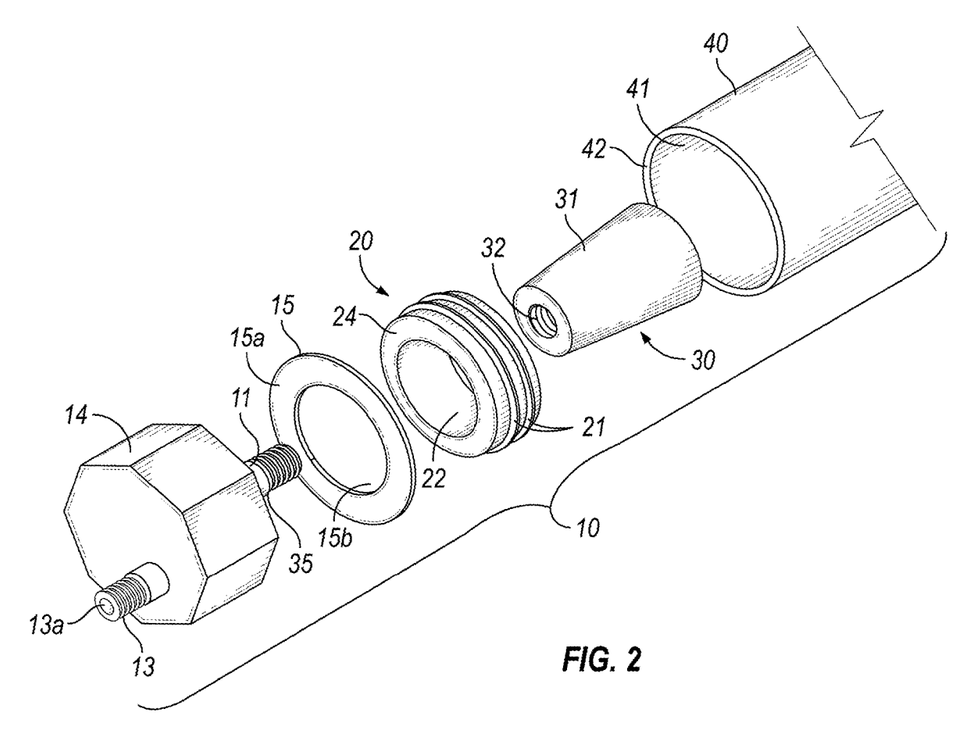
FIG. 2 is an exploded view of the plug of FIG. 1.

The compression member 20 has a body 24 with an internal channel 22 from end to end of the member 20 and through which projects the shaft 11 of the nut 14. A seal, or as shown in FIG. 2, spaced apart seal member(s) 21 are provided on the exterior surface of the member 20 and may be formed integrally thereof or may be separate items affixed to the sleeve 20. The member 20 and the seal members 21 can be made of any suitable sealing material, e.g., metal, alloy metals, steel, alloy steel, stainless steel, or brass. The member 20 and the seal members 21 can be one integral piece or the seal members may be attached to, adhered to, glued to, or connected to the member.

Figure 3:
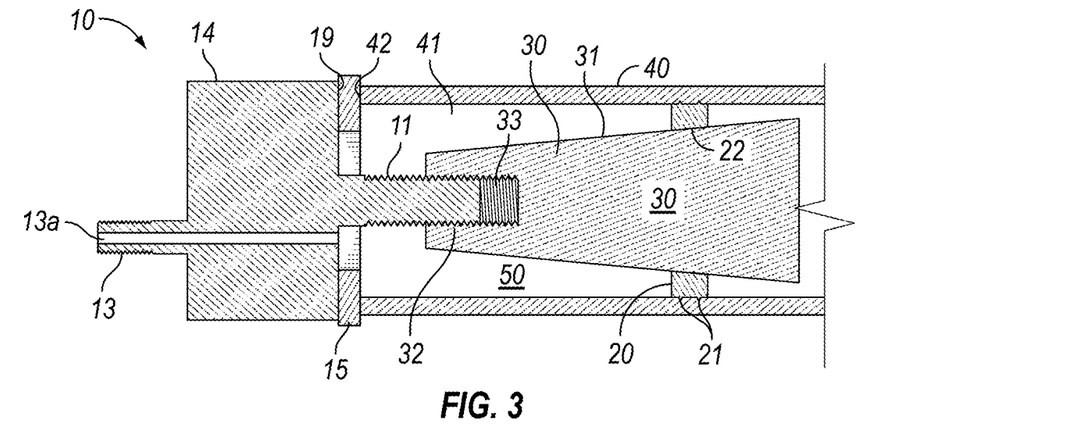
FIG. 3 is a cross-section view of the plug of FIG. 1 installed in a tubular.
Figure 4:
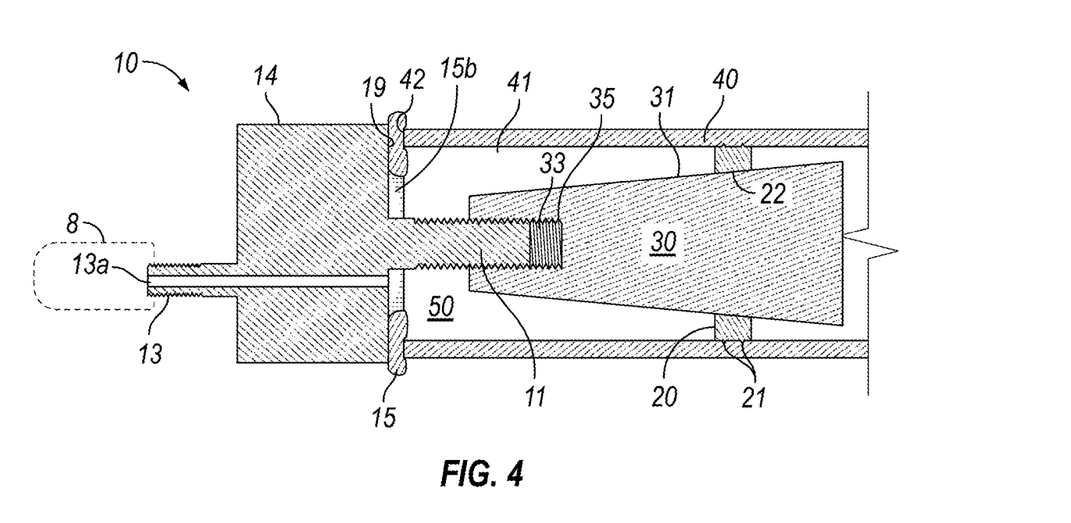
FIG. 4 is a cross-section view of the plug of FIG. 1 compressed in a tubular.

FIGS. 3-4 illustrate the installation of the plug 10 in a tubular 40, e.g., a tube of a heat exchanger or an oilfield tubular. The tubular 40 has an edge or face 42 and a channel 41 therethrough from end to end.

For installation within a tubular, the compression member 20 is placed on the cone 30 with part of the cone 30 projecting through the body 21 of the member 20. Then, with the washer 15 between the edge 42 of the tubular 40 and the nut 14 (see FIG. 7), the threaded end 12 of the shaft 11 is inserted to engage the internal threading 33 of the cone 30.

For testing the integrity of the tubular, the cone 30 of the plug 10 is inserted into a tubular, e.g., the tubular 40 as shown in FIG. 3, so that the member 20 is adjacent the interior surface of the channel 41 of the tubular 40 and the seal washer 15 is adjacent the edge 42 of the tubular 40. Once installed in a tubular, the nut 14 is rotated, drawing the nut 14 toward the cone 30. This then tightens the seal washer 15 between the interior face of the nut 14 and the edge 42 of the tubular 40, sealing the washer/tubular interface and thus sealing off one end of a seal space 50 within the tubular 40. Rotating the nut 14 moves the ramped surface 31 of the cone 30 to force the member 20 radially outwardly against the interior surface of the tubular and into sealing contact it. Optionally, the cone 30 with the member 20 may be installed within a tubular, e.g. using a hydraulic drawing system that pulls the cone 30 through the member 20, thereby expanding the member 20 so that it seals against the interior surface of the channel 41.

With the space 50 effectively isolated within the tubular 40, to test the integrity of the portion of a tubular adjacent the space 50 and/or to test the sealing effectiveness of the member 20, fluid under pressure is applied to the channel 13a with an external testing apparatus or device 8 (see FIG. 4, device 8 shown in dotted line), the pressurized fluid flowing through the washer 15 and into the space 50. The testing apparatus may include any suitable systems, parts, devices, gauges, circuits, sensors, monitor(s), computer(s), and controllers for applying a suitable pressurized test fluid, controlling the flow of the fluid, monitoring the pressure of the fluid over time, and, as desired, for providing alerts, messages and/or alarms. Optionally, separate apparatuses may supply the pressurized test fluid and perform sensing/monitoring functions.

As desired, a suitable liquid or gas at a suitable test pressure is used and, as desired, the pressure in maintained for a suitable period of time, with the plug effectively sealing off the space 50, to test a portion of the tubular. Such a test can provide indications of cracks, holes, defects, fissures, leaks, and other anomalies, etc.

Figure 2A:
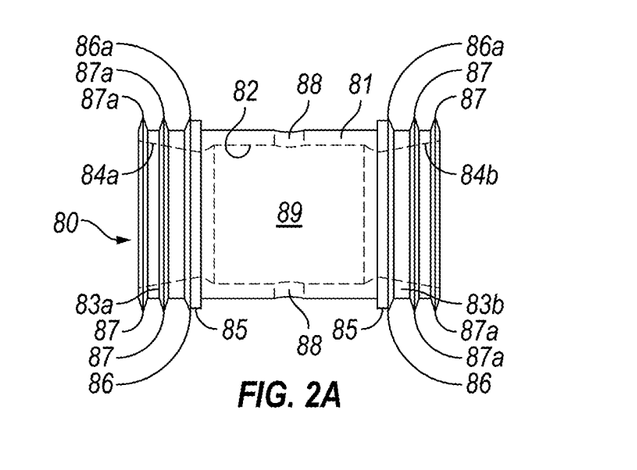
FIG. 2A is a side view, partially in cross-section, of a compression member.

Turning now to FIG. 2A, an embodiment of a compression member 80 is depicted which can be used with any suitable test plug, including but not limited to, test plugs according to the present invention. The compression member 80 has a body 81 with a channel 89 therethrough defined by an interior surface 82 of the body 81 and extending from one end 83*a* to the other end 83*b*. Flow ports 88 (any suitable number may be used, e.g., one, two, three, four or more; two shown) through the body 81 permit fluid flow between the exterior of the member 80 and the channel 89. Tapered portions 84*a* and 84*b* of the surface 82 are at each end 83*a*, 83*b*, respectively, of the body 81.

Base members 85 abut inner rings 86 which encircle the body 81. Outer rings 87 encircle the body 81 at each end of the body. The bases 85 locate the inner rings 86, support and back up the inner rings 86, prevent collapse of the rings when under pressure, and/or limit the extent to which the points or projecting portions can be embedded in a thing or in a tubular).

The tapered portions 84*a* and 84*b* are angled so that upon contact by a correspondingly tapered surface of a member, compression sleeve and/or of a mandrel: desired radially outward movement of end(s) of a compression member is achieved; desired position of a compression member within a tubular is maintained during the application of fluid under pressure within the tubular; undesirable axial movement of a compression member is inhibited; and/or desired application of axially opposed compression forces to a compression member is enhanced.

In embodiments, the bases 85 may be deleted, or the inner rings 86 may be deleted, or the outer rings 87 may be omitted. Any suitable and desired number of inner rings 86 and/or outer rings 87 can be employed, e.g., but not limited to, one, two, three, four, five or more.

In embodiments, the rings may be generally cylindrical or toroidal, and they can have a flat circumferential outer surface; or they may have a rippled surface or a pointed surface which facilitates embedding into an interior wall of an enclosure or tubular to be tested. For example, as shown in FIG. 2A, the inner rings 86 may have circumferential projecting pointed structure 86*a* and the outer rings 87 may have points 87*a*.

Figures 5, 6:
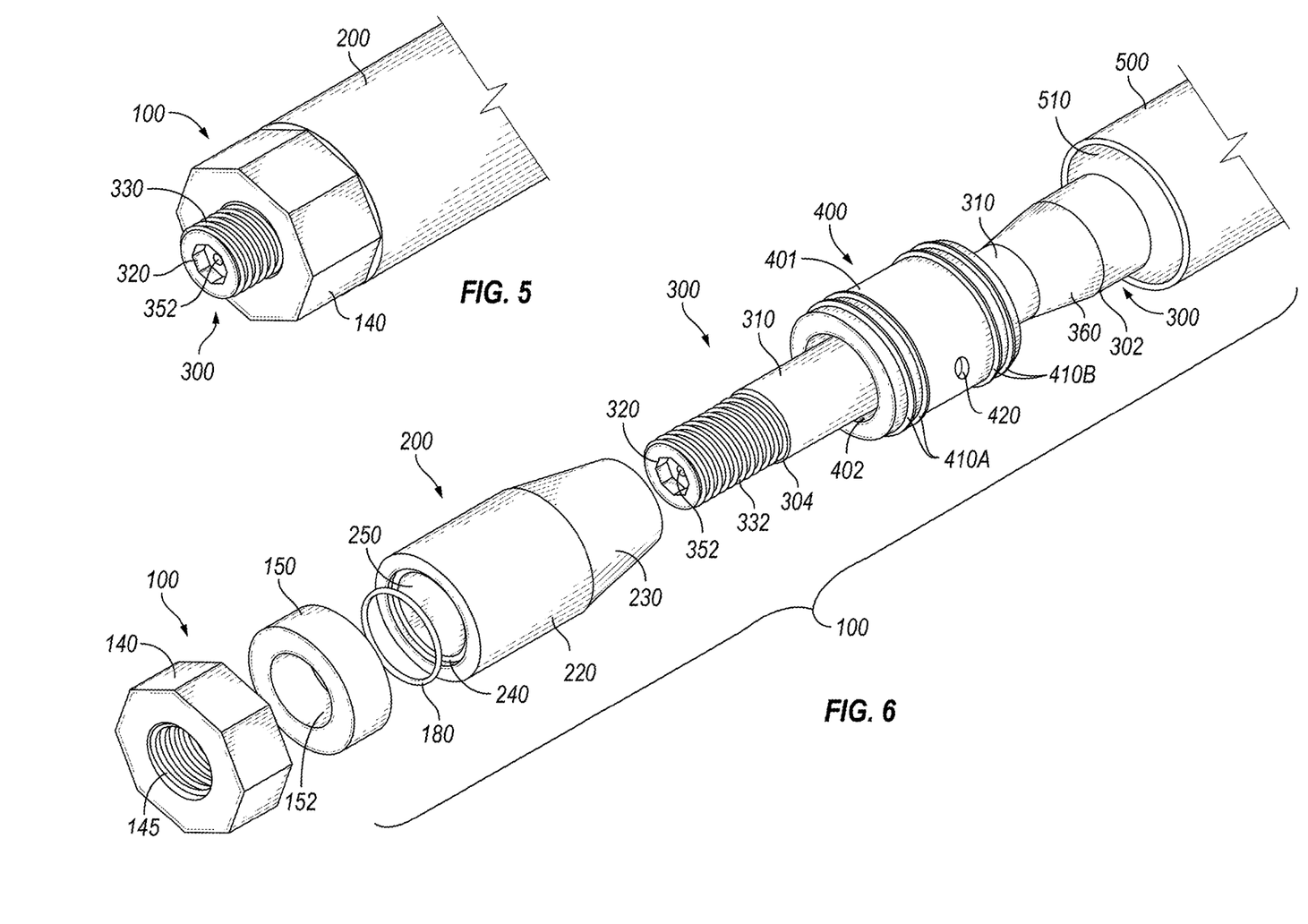
FIG. 5 is a perspective view of a plug according to the present invention installed in a tubular.
FIG. 6 is an exploded view of the plug of FIG. 5.

Turning now to FIGS. 5-6, an embodiment of a plug 100 is depicted comprising a shaft 300, a compression member 400, a mandrel 200, a compression nut 140, and a washer 150. The shaft 300 has a body 310 with ends 302 and 304. The end 302 has a ramp 360 which has a semi-conical shape. The end 304 has a threaded portion 332 with an end socket 320 for receiving a part of a corresponding tool, e.g., a hex wrench corresponding to the hex shape as shown in FIGS. 5-6. A channel 350 extends within the body 310 and has an inlet 352 at the end 304 and an outlet 354 (see FIG. 7) at the end 302.

The compression member 400 has a body 401 with a channel 402 (see FIG. 8) therethrough from end to end and seal portions 404*a* and 404*b* projecting out from the body 401 for sealing contact with an interior of a tubular to be tested. Ports 420 provide a fluid flow path for fluid flow out from within the member 400. Spaced apart seal members 410A and 410B projecting outwardly may be provided on the seal portions 404*a* and 404*b*. The seal members 410A and 410B are connected to or formed integrally of the exterior of the body 401. The compression member 400 can be made of any suitable sealing material, e.g., but not limited to, rubber, PTFE, or graphite.

In certain particular aspects, the present invention provides methods for testing tubes of heat exchangers, including tubes of shell and tube heat exchangers, tubes of steam boilers, and tubes of air-cooled heat exchangers; exemplars of such tubes may be about one quarter inch to three inches in inner diameter, made of metal, and tested to pressures between 0 psi and 7000 psi.

In an embodiment, any desired number (e.g., one, two, three, four or more) of seal portions like the seal members 410A and 410B and the seal portions 404*a* and 404*b* may be used at each end of a compression sleeve.

The mandrel 200 has a body 220 with a central channel 250 therethrough from end to end and a ramped portion 230 for selectively contacting the sleeve 400. A recess 240 is sized and configured to hold a seal 180, which may be an O-ring seal made of any suitable seal material, including, but not limited to, rubber, synthetic seal material, and plastic. The nut 140 has interior threading 145. The washer 150 has a channel 152 through it from one end to the other.

Figure 7:
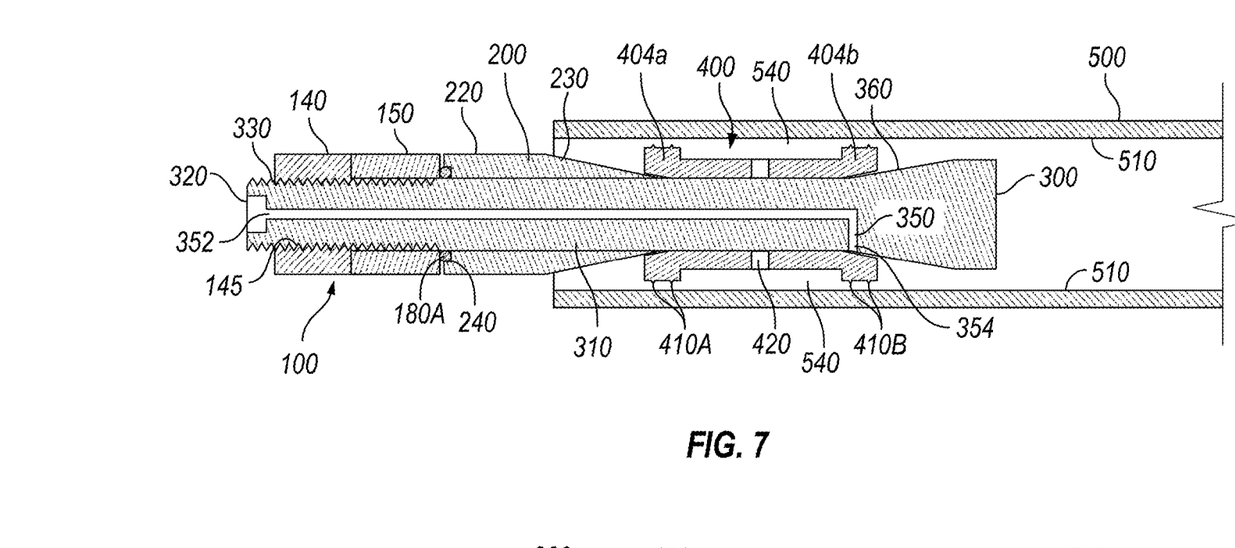
FIG. 7 is a cross-section view of the plug of FIG. 5 installed in a tubular.
Figure 8:
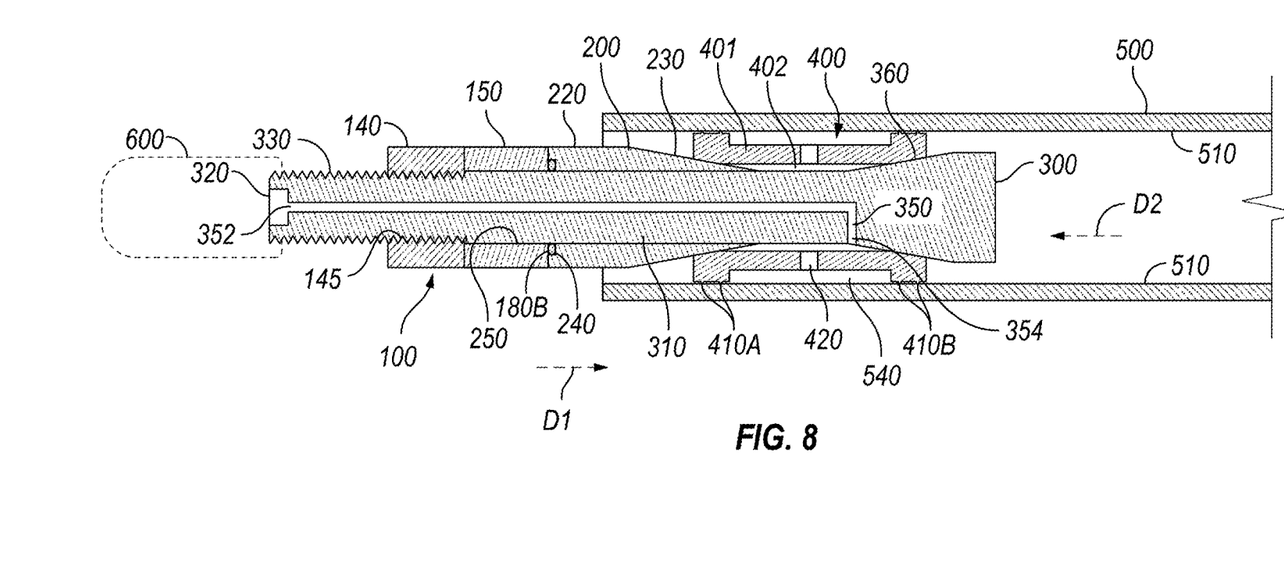
FIG. 8 is a cross-section view of the plug of FIG. 5 compressed in a tubular.

Turning now to FIGS. 7-8, an embodiment of the plug 100 installed within a tubular 50 (e.g., a tube of a heat exchanger or an oilfield tubular) is depicted. The tubular 500 has a central flow channel 510. For installation within a tubular, the compression member 400 is placed on the shaft 300 so that it contacts and abuts the ramp 360. Then the end 330 of the shaft 300 is inserted through the mandrel sleeve 200 so that the cone end 230 of the sleeve 200 abuts the member 400. The seal member 180 is placed into position in the recess 240 (shown as compressed, FIG. 7, numeral 180A). The washer 150 is placed around the threaded portion 332 of the end 330 of the shaft 300. The nut 140 is threaded onto the threaded portion 332 of the shaft 300.

The plug 100 is then inserted into an interior channel or passage in a tubular, such as the interior channel 510 of the tubular 500, as shown in FIG. 7. In this position, the compression sleeve 400 is not yet compressed and its seal member(s) have not been forced against the interior of the tubular by fluid under pressure. To compress the member 400 and move its sealing parts into sealing contact with the interior of the tubular, a hex key wrench is placed into the socket 320 to hold the plug in position and then the nut 140 is rotated, moving the nut 140 on the threaded portion 332 of the shaft 300. As the nut 140 is being rotated, the washer 150 contacts and compresses the seal 180 (shown as compressed, FIG. 8, numeral 180B) sealing the mandrel/shaft interface. The cone end 230 of the mandrel 200 is moved against and into the member 400, moving the member 400 against the ramp 360 of the shaft 300, forcing the member 400 radially outwardly so that the seals 404*a* and 404*b* sealingly contact the interior of the channel 510 of the tubular 500 (shown in FIG. 8). When the seal members 410A and 410B are present, they are moved to sealingly contact the interior surface of the channel 510 of the tubular 500. Thus, a test space 540 is sealed off within the tubular 500. "D1" and "D2" in FIG. 8 indicate the opposing forces applied by the sleeve and the mandrel.

In a method embodiment, the integrity of a portion of a tubular such as the tubular 500 is tested by first removing any tool or wrench present from the socket 320. Then fluid under pressure is applied to the plug with a test apparatus 600 (shown in dotted lines, FIG. 8) at the port 352. The pressurized fluid (e.g., water or air) flows to and through the channel 350, into the space 402 between an interior of the member 400 and an exterior surface of the shaft 300, and then from this space 402 out through the port(s) 420 into the space 540.

In certain particular aspects, air is used for the test fluid at a suitable test pressure and the pressure is maintained for a suitable period of time to insure that the plug has effectively sealed off the space 540 and that there are no leaks from the test space within the tubular 500.

Turning now to FIGS. 9-12, an embodiment of a plug 700 is depicted which has a mandrel 710, a spacer 730, a compression member 740, a plug body 750, a compression seal 790, a compression sleeve 760, and a compression nut 780. The compression nut 780 has handles 784 projecting from a body 782 and an interior threaded bore 750 from one end to the other. The compression sleeve 760 has a body 762 with an interior bore 764 and, optionally, a tapered end 766. The compression seal 790 has an interior surface 792 that defines a bore 791 through the seal. The plug body 750 has a flanged end 754 with a face 794 spaced apart from an end 755 which has external threading 756. A shaft 758 projecting from the end 755 has a port 751 which is in fluid communication with a channel 753 (see FIG. 11) which extends from one end of the body 750 to the other. The body 750 has an internally threaded bore 757 (see FIG. 11). The compression member 740 has body 742 and an interior surface 745 that defines a bore 743 through the member 740. Optional seal rings 744 project out from the body 742. The spacer 730 has a central ring 732 and threaded ends 734a and 734b. The mandrel 710 has a tapered surface 712 and an internal threaded bore 720.

To assemble the plug 700 (shown in FIG. 11 post-assembly), the end 734b of the spacer 730 is inserted to threadedly engage the bore 720 of the mandrel 710, and, after tightening with respect to the spacer 730, the compression member 740 is placed on the mandrel 710 with the end 734a of the spacer 730 projecting from the mandrel 710 (or the member 740 is first placed on the mandrel 710). Then the end 734a of the spacer is positioned to threadedly engage the thread of the bore 757 of the plug body 750, with the mandrel 710 movable with respect to the member 740. The compression seal 790 is placed around the plug body 750 and then the end 756 is inserted through the compression sleeve 760 so that the compression sleeve 760 is movable with respect to the plug body 750. With part of the threaded end 756 of the plug body projecting out from the compression sleeve 760, the compression nut 780 is rotated so that its threading 786 engages the threaded end 756 of the body 750. Upon contact of the nut 780 with the sleeve 760, the nut 780 is then rotated to draw the mandrel 710 toward it, moving the compression member 740 radially outward; and moving the compression sleeve 760 to contact the compression seal 790.

Figure 11:
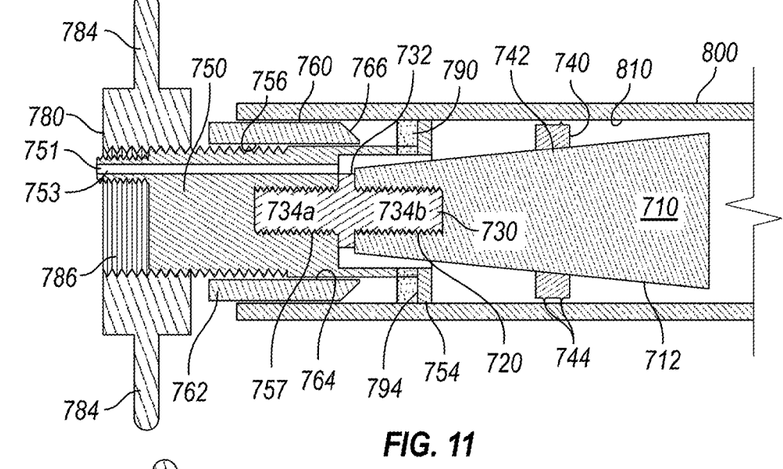
FIG. 11 is a cross-section view of the plug of FIG. 9 installed in a tubular.

FIG. 11 shows the assembled plug 700 with the mandrel 710, the compression member 740, the compression seal 790, and part of the compression sleeve 760 within a tubular 800 to be pressure tested.

Figure 12:
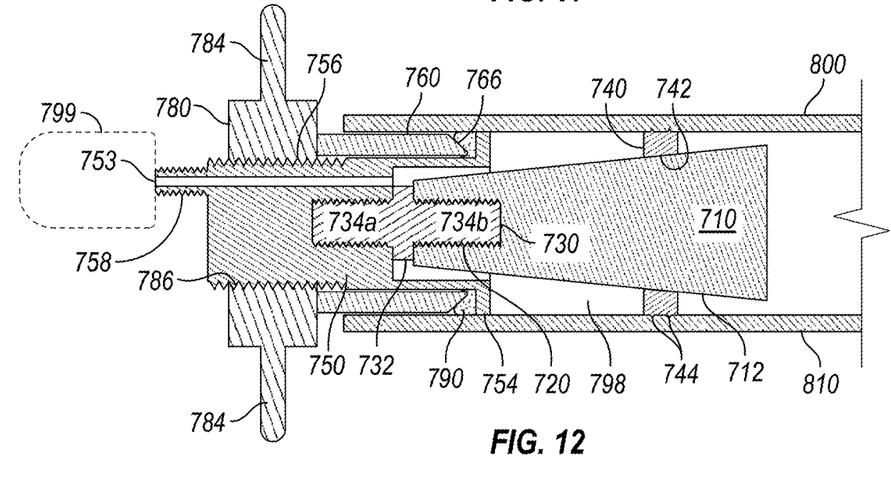
FIG. 12 is a cross-section view of the plug of FIG. 9 compressed in a tubular.

A shown in FIG. 12, with the plug 700 installed in an interior 810 of the tubular 800, a sealed-off test space 798 has been isolated by the plug 700. Tightening the nut 780 has moved the compression sleeve 760 so that its tapered surface 766 has contacted the seal 790 and has then forced the compression seal 790 toward the flange end 754 of the plug body 750, thereby forcing the compression seal 790 into sealing contact with the interior of the tubular 800 and into sealing contact with the flange end 754. Tightening of the nut 780 has also pulled the mandrel 710, moving the tapered surface 712 of the mandrel 710 with respect to the interior ramped surface 742 of the compression member 740, forcing the compression member 740 into sealing contact with the interior of the tubular 780, embedding the rings 744 into the interior surface of the tubular 800. Optionally, the mandrel 710 and the member 740 are installed within a tubular, e.g. using a hydraulic drawing system, and the mandrel 710 is pulled through the member 740 to effect sealing.

In the position shown in FIG. 12, the central member 732 of the spacer 730 maintains the mandrel 710 spaced apart from the plug body 750 in such a position that the mandrel 710 does not close off the a flow path from the plug body 750 and through its flange end 754 into the space 798. To test the portion of the wall of the tubular 800 adjacent the test space 798, fluid under pressure, supplied by the test apparatus 799 (see FIG. 12) to the port 751, flows through the bore 753 of the plug body 750 into the space 798.

Embodiments of the present invention provide methods for testing the effectiveness of a permanent repair plug previously installed in a hollow member, e.g. within a hollow tubular. Some known permanent repair plugs include a tapered mandrel (e.g., but not limited to, the cone 30, FIG. 1 or the mandrel 710, FIG. 11) and a seal or compression member (e.g., but not limited to, member 20, FIG. 3, and member 740, FIG. 11). Such a mandrel/seal combination may have been in the past installed at a desired location within a tubular, e.g., to seal off the tubular so that flow past the mandrel/seal combination is prevented. Such a combination can be installed by pulling on the mandrel to force the compression member outwardly into sealing contact with the interior of the tubular, closing off the tubular to fluid flow.

These previously-installed combinations can be tested using a test plug according to the present invention. Such test plugs include, e.g., structures as shown in FIG. 2 and FIG. 6 (without the mandrel/seal combination shown in those figures).

The embodiment of the present invention shown in FIGS. 5-8 provides a test plug that itself incorporates a structure for sealing off a space to flow. The test plug 100 itself provides the seal for sealing off a portion of an interior to fluid flow and the structure for testing the effectiveness of the seal. A seal member according to the present invention, e.g., but not limited to the member 400, FIG. 6, upon installation, provides a seal for preventing flow through the equipment, and other structure included in the plug creates a test space for then testing the effectiveness of the seal.

Figures 9, 10:
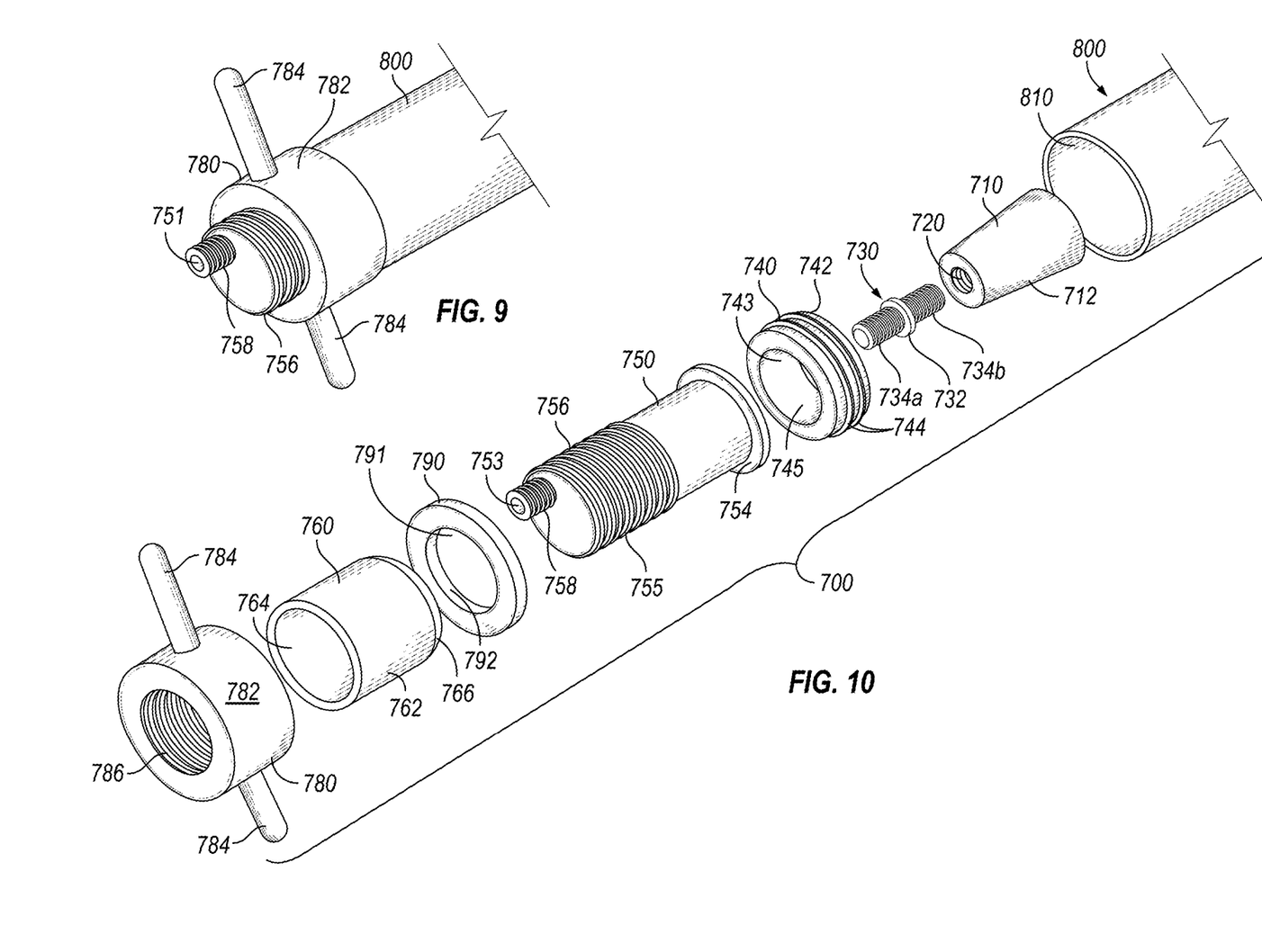
FIG. 9 is a perspective view of a plug according to the present invention installed in a tubular.
FIG. 10 is an exploded view of the plug of FIG. 9.

Turning now to FIGS. 13-16, an embodiment of the present invention is depicted comprising a plug 700a similar to the plug 700 depicted in FIG. 9 (like numerals and indicators indicate like parts; and similar parts are installable, movable, and function as do the parts of the plug 700 unless otherwise indicated). The plug 700a has a mandrel 710, a stud 730a, a compression member 740, a plug body 750a, a compression seal 790, a compression sleeve 760, and a compression nut 780.

The compression nut 780 has handles 784 projecting from a body 782 and an interior threaded bore 750 from one end to the other. The compression sleeve 760 has a body 762 with an interior bore 764 and, optionally, a tapered end 766. The compression seal 790 has an interior surface 792 that defines a bore 791 through the seal. The plug body 750a has a flanged end 754 with a face 794 spaced apart from an end 755 which has external threading 756. A shaft 758a projecting from the end 755 has a port which is in fluid communication with a channel 753a (see FIG. 11) which extends from one end of the body 750a to the other. The body 750a has an internally threaded bore 757 (see FIG. 11). The compression member 740 has body 742 and an interior surface 745 that defines a bore 743 through the member 740. Optional seal rings 744 project out from the body 742. The stud 730a has a central member 732a and threaded ends 734a and 734b. The mandrel 710 has a tapered surface 712 and an internal threaded bore 720.

To assemble the plug 700a (shown in FIG. 15 post-assembly), the end 734b of the stud 730a is inserted to threadedly engage the bore 720 of the mandrel 710, and, after tightening with respect to the stud 730a the compression member 740 is placed on the mandrel 710 with the end 734a of the stud 730a projecting from the mandrel 710 (or the member 740 is first placed on the mandrel 710). Then the end 734a of the stud is positioned to threadedly engage the thread of the bore 757 of the plug body 750a, with the mandrel 710 movable with respect to the member 740. The compression seal 790 is placed around the plug body 750a and then the end 756 is inserted through the compression sleeve 760 so that the compression sleeve 760 is movable with respect to the plug body 750a. With part of the threaded end 756 of the plug body projecting out from the compression sleeve 760, the compression nut 780 is rotated so that its threading 786 engages the threaded end 756 of the body 750a. Upon contact of the nut 780 with the sleeve 760, the nut 780 is then rotated to draw the mandrel 710 toward it, moving the compression member 740 radially outward; and moving the compression sleeve 760 to contact the compression seal 790.

Figure 15:
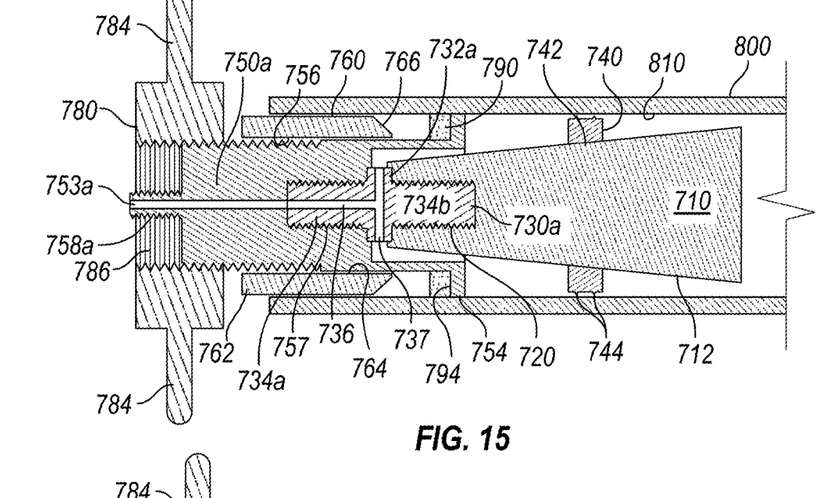
FIG. 15 is a cross-section view of the plug of FIG. 13 installed in a tubular.

FIG. 15 shows the assembled plug 700a with the mandrel 710, the compression member 740, the compression seal 790, and part of the compression sleeve 760 within a tubular 800 to be pressure tested.

Figure 16:
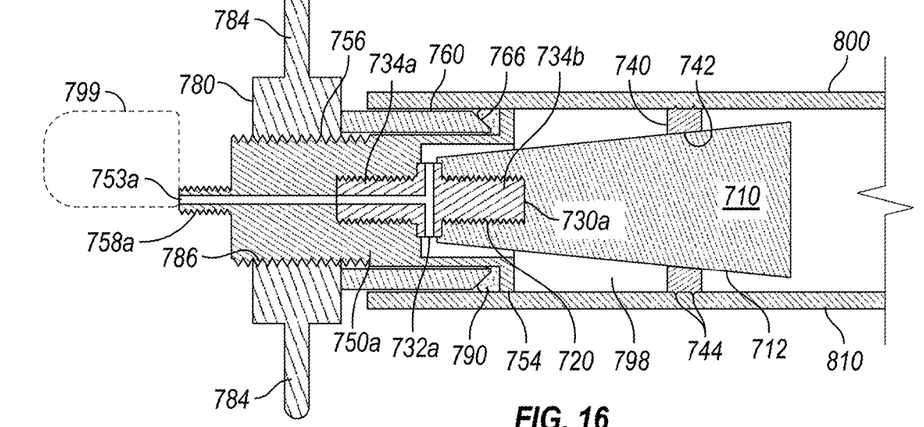
FIG. 16 is a cross-section view of the plug of FIG. 13 compressed in a tubular.

A shown in FIG. 16, with the plug 700a installed in an interior 810 of the tubular 800, a sealed-off test space 798 has been isolated by the plug 700a. Tightening the nut 780 has moved the compression sleeve 760 so that its tapered surface 766 has contacted the seal 790 and has then forced the compression seal 790 toward the flange end 754 of the plug body 750a, thereby forcing the compression seal 790 into sealing contact with the interior of the tubular 800 and into sealing contact with the flange end 754. Tightening of the nut 780 has also pulled the mandrel 710, moving the tapered surface 712 of the mandrel 710 with respect to the interior ramped surface 742 of the compression member 740, forcing the compression member 740 into sealing contact with the interior of the tubular 780, embedding the rings 744 into the interior surface of the tubular 800. Optionally, the mandrel 710 and the member 740 are installed within a tubular, e.g. using an hydraulic drawing system, and the mandrel 710 is pulled through the member 740 to effect sealing.

In the position shown in FIG. 16, the member 732a of the stud 730a maintains the mandrel 710 spaced apart from the plug body 750a in such a position that the mandrel 710 does not close off a flow path from the body 750a and through its flange end 754 into the space 798.

Figure 17:
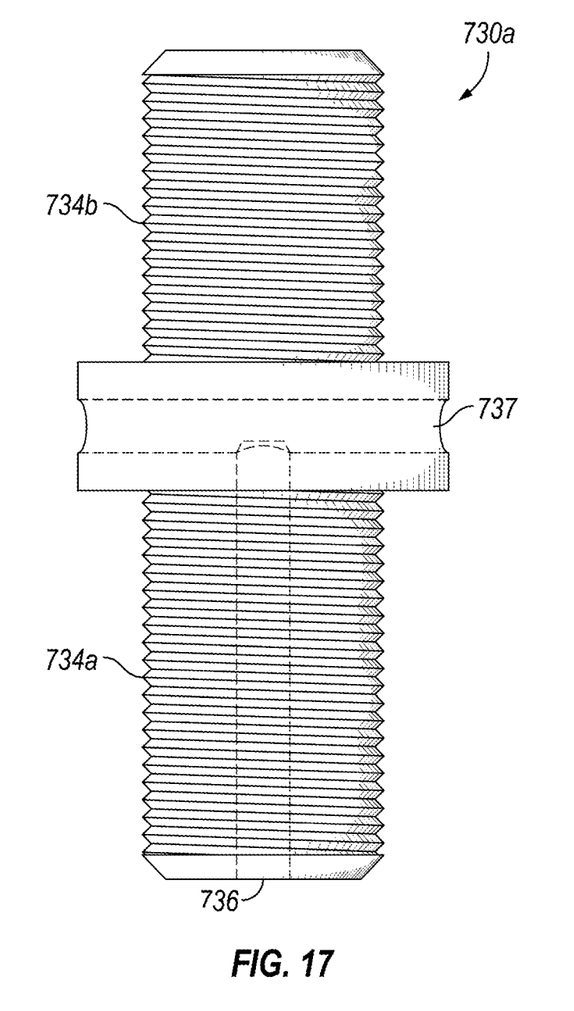
FIG. 17 is a side view of a stud of the plug of FIG. 13.

The stud 730a has a bore 736 through the end 734a which is in fluid communications with a channel 737 through the center of the member 732a. To test the portion of the wall of the tubular 800 adjacent the test space 798, fluid under pressure, supplied by the test apparatus 799 (see FIG. 16) to the port 751a, flows through the bore 753a of the plug body 750a, through the bore 736, through the channel 737, and then out from the member 732a and into the space 798.

Embodiments of the present invention comprise methods for testing the effectiveness of a permanent repair plug previously installed in a hollow member, e.g. within a hollow tubular. Some known permanent repair plugs include a tapered mandrel (e.g., but not limited to, the cone 30, FIG. 1 or the mandrel 710, FIG. 11) and a seal or compression member (e.g., but not limited to, member 20, FIG. 3, and member 740, FIG. 11). Such mandrel/seal combinations may have been in the past installed at a desired location within a tubular, e.g., to seal off the tubular so that flow past the mandrel/seal combination is prevented. Such a combination can be installed by pulling on the mandrel to force the compression member outwardly into sealing contact with the interior of the tubular, closing off the tubular to fluid flow.

Figures 13, 14:
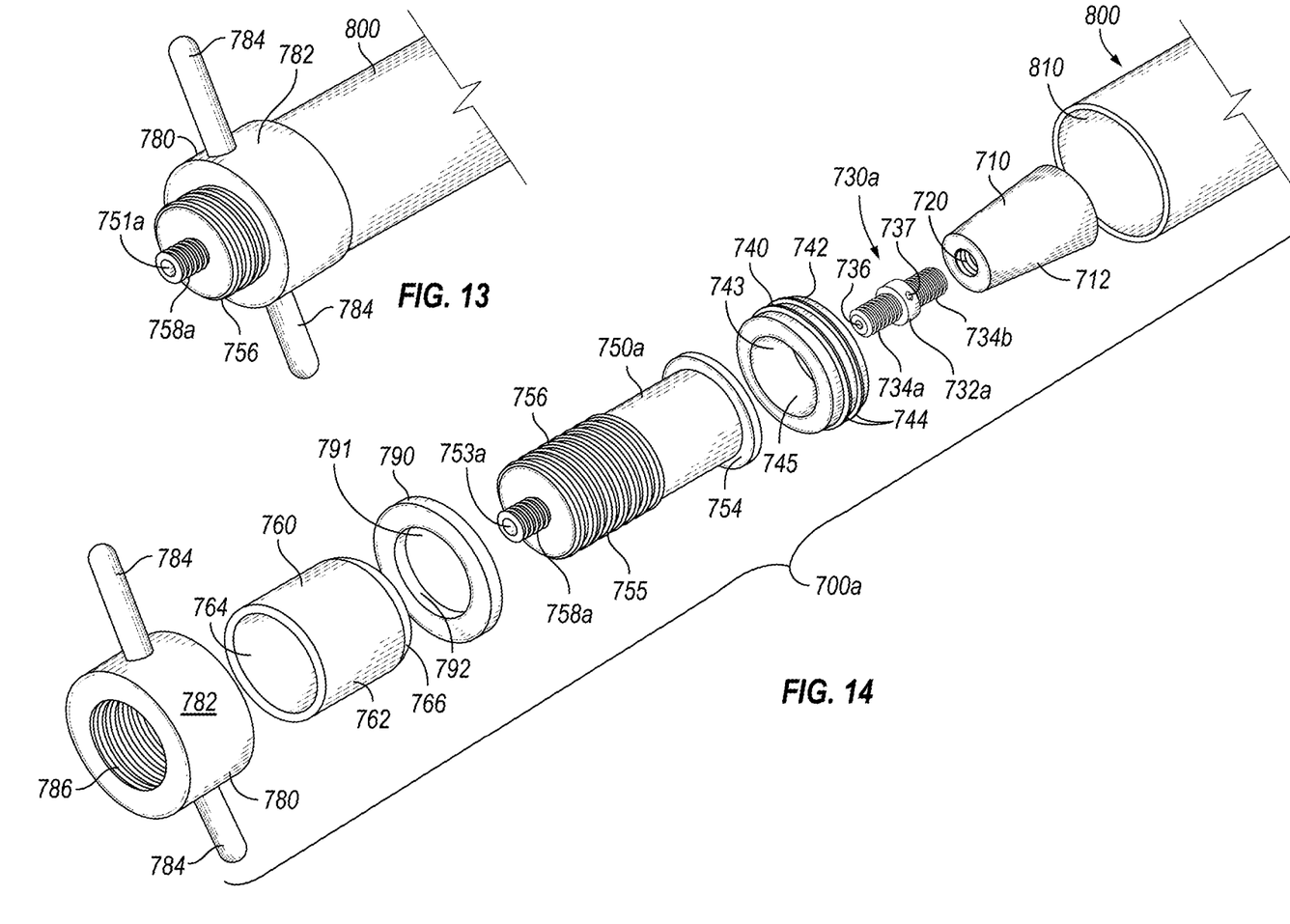
FIG. 13 is a perspective view of a plug according to the present invention installed in a tubular.
FIG. 14 is an exploded view of the plug of FIG. 13.

These previously-installed combinations can be tested using a test plug according to the present invention. Such test plugs include, e.g., structures as shown in FIG. 10 and FIG. 14 (without the mandrel/seal combination shown in those figures).

While various embodiments usable within the scope of the present disclosure have been described with emphasis, it should be understood that within the scope of the appended claims, the present invention can be practiced other than as specifically described herein.

The invention claimed is:

1. A plug for sealing and/or pressure testing a space within a hollow piece of equipment, the plug comprising:
   a body comprising an internal bore, internal threads, and external threads;
   a compression nut comprising internal threads, wherein the compression nut is disposed about the body such that the internal threads of the compression nut engage the external threads of the body;
   a mandrel comprising a tapered outer surface with a narrow end and a broad end, wherein the mandrel comprises internal threads at the narrow end;
   a stud connecting the body to the narrow end of the mandrel, wherein the stud comprises:
      a first portion having first external threads that engage the internal threads of the body;
      a second portion having second external threads that engage the internal threads of the mandrel; and
      an internal bore that is connected to the internal bore of the body; and
   a sealing member disposed around the tapered outer surface of the mandrel,
   wherein rotating the compression nut around the body causes the body to move and pull the mandrel with respect to the sealing member such that the tapered outer surface of the mandrel forces the sealing member outward to engage an interior surface of the hollow piece of equipment to fluidly isolate the space, wherein the internal bore of the stud is connected with the space.

2. The plug of claim 1, wherein the compression nut further comprises wing handles.

3. The plug of claim 1, wherein the body further comprises a protrusion having secondary external threads, wherein the internal bore of the body extends through the protrusion.

4. The plug of claim 1, wherein:
   the internal bore of the body extends axially through the body;
   the stud further comprises a central ring between the first portion of the stud and the second portion of the stud;

the central ring is located between the body and the narrow end of the mandrel;

the internal bore of the stud extends axially through the first portion of the stud and radially through the central ring of the stud; and the internal bore of the stud has an outlet on a lateral surface of the central ring of the stud.

5. The plug of claim 1, wherein:

the body further comprises a first portion having the external threads and a second portion having a flange;

the plug further comprises:
 a compression sleeve disposed about the body; and
 a compression seal disposed about the body between the compression sleeve and the flange; and rotating the compression nut around the body further causes the body to move with respect to the compression sleeve and compress the compression seal between the compression sleeve and the flange thereby causing the compression seal to engage the interior surface of the hollow piece of equipment to further fluidly isolate the space.

6. A method for sealing and pressure testing a space within a hollow piece of equipment comprising:

placing a plug within the hollow piece of equipment, wherein the plug comprises:
 a body comprising an internal bore, internal threads, and external threads;
 a compression nut comprising internal threads, wherein the compression nut is disposed about the body such that the internal threads of the compression nut engage the external threads of the body;
 a mandrel comprising a narrow end, a broad end, and a tapered outer surface, wherein the mandrel further comprises internal threads at the narrow end;
 a stud connecting the body to the narrow end of the mandrel, wherein the stud comprises a first portion having first external threads that engage the internal threads of the body, a second portion having second external threads that engage the internal threads of the mandrel, and an internal bore that is connected to the internal bore of the body; and
 a sealing member disposed around the tapered outer surface of the mandrel;

rotating the compression nut around the body to cause the body to move and pull the mandrel with respect to the sealing member such that the tapered outer surface of the mandrel forces the sealing member outward to engage an interior surface of the hollow piece of equipment to fluidly isolate the space; and pressurizing the space through the internal bore of the body and the internal bore of the stud.

7. The method of claim 6, wherein:

the internal bore of the body extends axially through the body;

the stud further comprises a central ring between the first portion of the stud and the second portion of the stud;

the central ring is located between the body and the narrow end of the mandrel;

the internal bore of the stud extends axially through the first portion of the stud and radially through the central ring of the stud; and the internal bore of the stud has an outlet on a lateral surface of the central ring of the stud.

8. The method of claim 6, wherein:

the body further comprises a first portion having the external threads and a second portion having a flange;

the plug further comprises:
 a compression sleeve disposed about the body; and
 a compression seal disposed about the body between the compression sleeve and the flange; and rotating the compression nut around the body further causes the body to move with respect to the compression sleeve and compress the compression seal between the compression sleeve and the flange thereby causing the compression seal to engage the interior surface of the hollow piece of equipment to further fluidly isolate the space.

9. A plug for sealing and/or pressure testing a space within a hollow piece of equipment, the plug comprising:

a body comprising an internal bore, internal threads, and external threads;

a compression nut comprising internal threads, wherein the compression nut is disposed about the body such that the internal threads of the compression nut engage the external threads of the body;

a mandrel comprising a tapered outer surface and internal threads;

a stud connecting the body to the mandrel, wherein the stud comprises a first portion having first external threads, a second portion having second external threads, and an internal bore that is connected to the internal bore of the body and with the space, wherein the first external threads of the stud engage the internal threads of the body, and wherein the second external threads of the stud engage the internal threads of the mandrel; and a sealing member disposed around the tapered outer surface of the mandrel, wherein rotating the compression nut around the body causes the body to move thereby moving the mandrel with respect to the sealing member such that the tapered outer surface of the mandrel forces the sealing member radially outward to engage an interior surface of the hollow piece of equipment to fluidly isolate the space.

10. The plug of claim 9, wherein:

the stud further comprises: a central ring between the first portion of the stud and the second portion of the stud;

the central ring is located between the body and the mandrel; and the internal bore of the stud:
 extends axially through the first portion of the stud and radially through the central ring of the stud; and
 has an outlet on a lateral surface of the central ring of the stud.

11. The plug of claim 9, wherein:

the body comprises a first portion having the external threads and a second portion having a flange;

the plug further comprises:
 a compression sleeve disposed about the body; and
 a compression seal disposed about the body between the compression sleeve and the flange; and rotating the compression nut around the body further causes the body to move with respect to the compression sleeve and compress the compression seal between the compression sleeve and the flange thereby causing the compression seal to engage the interior surface of the hollow piece of equipment to further fluidly isolate the space.

* * * * *